United States Patent Office 3,161,906
Patented Dec. 22, 1964

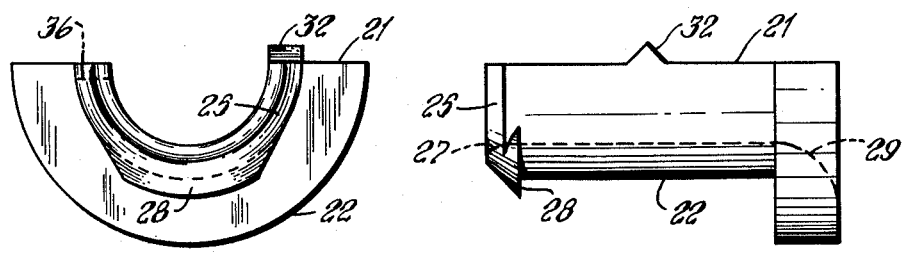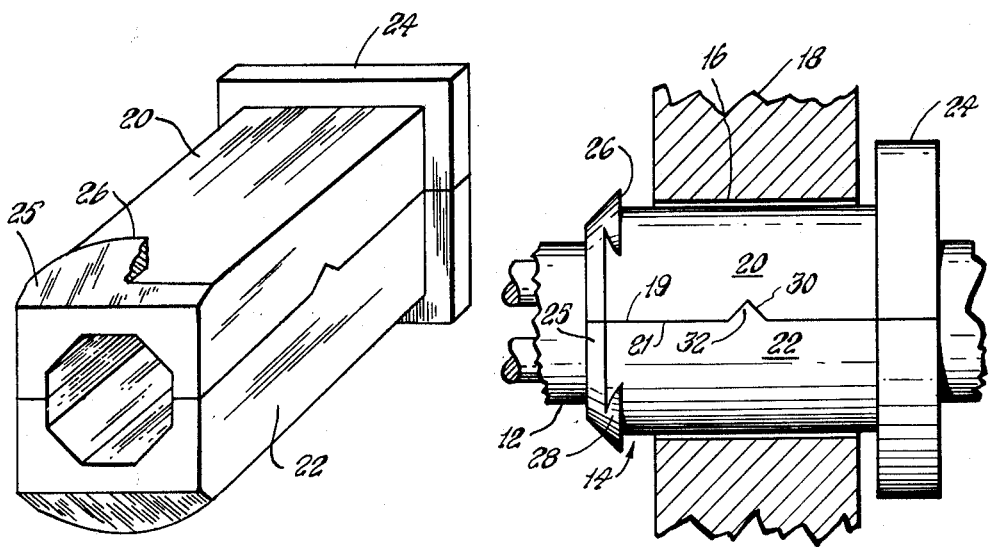

3,161,906
SPLIT BUSHING
Sidney D. Yarm, 1919 Lincoln Ave., East Meadow, N.Y.
Filed Nov. 7, 1961, Ser. No. 150,845
6 Claims. (Cl. 16—2)
(Granted under Title 35, U.S. Code (1952), sec. 266)

This invention described herein may be manufactured and used by or for the Government of the United States of America for governmental purposes without the payment of any royalties thereon or therefor.

This invention relates to bushings and especially to a split bushing which can be employed as a fairlead.

When electrical wiring passes through a metal panel, ordinary wear and tear causes the insulation to become frayed. Eventually, this condition may cause a short circuit with the possibility that electrical shock or a dangerous fire may result. Accordingly, good electrical practice requires the use of a bushing as a shield between the wiring and the panel, thus preventing any damage to the wiring.

The objects and advantages of the present invention are accomplished by an improved type of bushing comprising a split, non-tapered body, preferably, although not necessarily, cylindrical in shape with flanges at both ends. One end of the bushing body is tapered to permit its insertion through an opening having approximately the same diameter as the outside diameter of the bushing body. The flange on this end is also tapered and extends just slightly beyond the outside diameter of the bushing body. This tapered flange does not extend over the split portions of the circumference of the bushing body but is limited to portions of the circumference which are intermediate the split portions. The abutting surfaces of the split sections of the bushing contain complementary pairs of teeth and notches which fit together to prevent any relative motion between the sections.

An object of this invention is to protect objects which pass through the bushing from abrasion damage.

Another object is to permit installation of the bushing on existing wiring without the need for first removing the wiring.

A further object is to provide a bushing a single size of which is adaptable to a range of panel thicknesses.

Yet another object is to provide a bushing which can also be employed as a bushing-type bearing for rotating and/or reciprocating shafts, or as a low-friction fairlead for rope or chain.

Still another object is to provide a bushing which is inexpensive and simple to manufacture.

Other objects and many of the attendant advantages of this invention will be readily appreciated as the same becomes better understood by reference to the following detailed description when considered in connection with the accompanying drawings wherein:

FIG. 1 is a side perspective view of a bushing made in accordance with this invention;

FIG. 2 is a side perspective view of one section of the bushing shown in FIG. 1;

FIG. 3 is a front perspective view of the section of bushing shown in FIG. 2; and FIG. 4 is a perspective view, partially broken away, of another bushing made in accordance with this invention.

Similar reference characters apply to similar elements in the different views.

In FIG. 1, a cable 12 passes through a bushing 14 which, in turn, is seated in a hole 16 in a panel wall 18. The diameter of the hole 16 can be seen to be substantially the same as the outside diameter of the bushing 14. The particular bushing 14 shown is a cylindrical hollow tube which is split into two identical sections 20 and 22. There are flanges at both ends of the bushing 14, the right-side flange 24 extending a moderate distance beyond and completely around the body of the bushing. The left side of the bushing 14 is inwardly tapered at 25 and bears a pair of flanges 26 and 28, which constitute extensions of the inward taper 25.

The abutting surfaces 19 and 21 of the upper and lower bushing sections 20 and 22, respectively, bear a notch 30 and a complementarily shaped tooth 32, which mate to prevent longitudinally movement of the bushing sections relative to each other. Relative movement of the bushing sections could leave sharp edges to abrade and crimp the insulation of the cable 12. Of course, the opposite abutting surface of the upper section 20 has a tooth thereon, and the opposite abutting surface of the lower section 22 is formed with a mating notch 36 therefor. This is more clearly seen in FIG. 3. A side view of the lower section 22 is shown in FIG. 2; the upper section 20 would have the same appearance if it were rotated 180 degrees.

If the bushing is being employed to shield insulated wiring, it is preferable to round off or chamfer the circumference of the inner channel at both ends as shown in FIG. 2 at 27 and 29 so that angular edges are not presented to the insulation.

FIG. 3 shows that the tapered flange of each section is partial in extent. It does not extend completely around the circumference of the body of the bushing section but covers only about one-third of the circumference and lies intermediate the abuting surfaces. The distance the small flanges extend above the body of the bushing is on the order of 0.03 inch for a bushing body diameter of about ½ inch, which is just sufficient to prevent the bushing 14 from passing back through the opening 16; a greater extension would make insertion of the upper section more difficult. The height of the teeth on the abutting surfaces is also about 0.03 inch, which is sufficient to provide satisfactory gripping action. If the body diameter of the bushing is increased, the extension of the flange beyond the body may be increased, since the greater diameter permits the arch of the body to be more deeply depressed when the bushing is forced into the panel opening. Likewise, with greater body diameters, it is desirable to increase the height of the mating teeth.

The bushing sections are fabricated from a resilient, tough material such as nylon or linear polyethylene of sufficient thickness to provide rigidity, except under the installation conditions described below.

To install the bushing, one section is slipped beneath the cable and through the opening in the panel. The other bushing section is placed over the cable and on the first section with abutting surfaces sliding over each other; it is then pushed or tapped through the opening until the teeth mate with their complementary notches. The upper section can be pushed through the opening in spite of the fact that the upper edge of the tapered flange extends beyond the diameter of the opening because the taper allows it to start through the opening and the edges of the opening then exert a force on the tapered arch of the body of the bushing. Because of the resiliency of the material from which the bushing is made, the force exerted on the arch depresses and compresses it until it becomes small enough to slip through the panel opening. After it slips through the panel, it recovers its original shape and dimensions and the flanges prevent it from passing through the opening in either direction.

If desired, the body of the bushing may be fabricated in more than two sections.

The body of the bushing may also be made in cross-sections which are other than circular. For example, the cross-section may be square, rectangular, triangular, etc., to fit various hole-shapes. FIG. 4 shows a perspective view of a bushing which has a square cross-section.

The figure has been partially broken away to show the tapered flange more clearly. Of course, the cross-section of the channel through the bushing may also be varied as desired; that shown in FIG. 4 is octagonal. This feature would be useful where the bushing is used as a bushing or bearing for a shaft which has other than a circular cross-section. In this case, the bushing may be fabricated from lubricant-impregnated nylon or other suitable materials.

Obviously many modifications and variations of the present invention are possible in the light of the above teachings. It is therefore to be understood that within the scope of the appended claims the invention may be practiced otherwise than as specifically described.

I claim:

1. A bushing for insertion and retention in an encompassing opening in an object comprising, in combination: a hollow, rigid longitudinal element formed from resilient material, the outer circumferential dimension of said element being substantially equal to the circumferential dimension of said encompassing opening, said element being split longitudinally into sections the abutting surfaces of which have mating pairs of teeth and notches to prevent relative longitudinal motion between said sections, said element having a retaining flange at one end and being inwardly tapered at the other end, the tapered end having a sectioned, tapered flange constituting an extension of the taper of said element, the amount of extension of the sectioned flange beyond the outer circumference of said element being just sufficient to prevent said bushing from passing back through said encompassing opening after it has been pushed therethrough, said section of said tapered flange being located along the circumference of its associated element section intermediate the split-surface ends.

2. A bushing for insertion and retention in an encompassing opening in an object comprising, in combination: a hollow, rigid longitudinal element formed from resilient material, the outer circumferential dimension of said element being substantially equal to the circumferential dimension of said encompassing opening, said element being split longitudinally into sections the abutting surfaces of which have mating pairs of teeth and notches to prevent relative longitudinal motion between said sections, said element having a retaining flange at one end and being inwardly tapered at the other end, the tapered end having a sectioned, tapered flange constituting an extension of the taper of said element, the amount of extension of the sectioned flange beyond the outer circumference of said element being just sufficient to prevent said bushing from passing back through said encompassing opening after it has been pushed therethrough, said section of said tapered flange being located along the circumference of its associated element section intermediate the split-surface ends, the outer circumferential shape and dimension of said element being constant between said flanges.

3. A bushing for insertion and retention in an encompassing opening in an object comprising, in combination: a hollow, rigid longitudinal element formed from resilient material, the outer circumferential dimension of said element being substantially equal to the circumferential dimension of said encompassing opening, said element being split longitudinally into two identical sections the abutting surfaces of which have mating pairs of teeth and notches to prevent relative longitudinal motion between said sections, said element having a retaining flange at one end and being inwardly tapered at the other end, the tapered end having a sectioned, tapered flange constituting an extension of the taper of said element, the amount of extension of the sectioned flange beyond the outer circumference of said element being just sufficient to prevent said bushing from passing back through said encompassing opening after it has been pushed therethrough, said section of said tapered flange being located along the circumference of its associated element section intermediate the split-surface ends.

4. A bushing for insertion and retention in an encompassing opening in an object comprising, in combination: a hollow, rigid tube formed from resilient material, the outer circumferential dimension of said tube being substantially equal to the circumferential dimension of said encompassing opening, said tube being split longitudinally into sections the abutting surfaces of which have mating pairs of teeth and notches to prevent relative longitudinal motion between said sections, said tube having a retaining flange at one end and being inwardly tapered at the other end, the tapered end having a sectioned, tapered flange constituting an extension of the taper of the tube, the amount of extension of the sectioned flange beyond the outer circumference of said tube being just sufficient to prevent said bushing from passing back through said encompassing opening after it has been pushed therethrough, each section of said tapered flange being located along the circumference of its associated tube section intermediate the split-surface ends.

5. A bushing for insertion and retention in an encompassing opening in an object comprising, in combination: a hollow, rigid tube formed from resilient material, the outer circumferential dimension of said tube being substantially equal to the circumferential dimension of said encompassing opening, said tube being split longitudinally into sections the abutting surfaces of which have mating pairs of teeth and notches to prevent relative longitudinal motion between said sections, said tube having a retaining flange at one end and being inwardly tapered at the end, the tapered end having a sectioned, tapered flange constituting an extension of the taper of the tube, the amount of extension of the sectioned flange beyond the outer circumference of said tube being just sufficient to prevent said bushing from passing back through said encompassing opening after it has been pushed therethrough, each section of said tapered flange being located along the circumference of its associated tube section intermediate the split-surface ends, the outer circumferential shape and dimension of said tube being constant between said flanges.

6. A bushing for insertion and retention in an encompassing opening in an object comprising, in combination: a hollow, rigid tube formed from resilient material, the outer circumferential dimension of said tube being substantially equal to the circumferential dimension of said encompassing opening, said tube being split longitudinally into two identical sections the abutting surfaces of which have mating pairs of teeth and notches to prevent relative longitudinal motion between said sections, said tube having a retaining flange at one end and being inwardly tapered at the other end, the tapered end having a sectioned, tapered flange constituting an extension of the taper of the tube, the amount of extension of the sectioned flange beyond the outer circumference of said tube being just sufficient to prevent said bushing from passing back through said encompassing opening after it has been pushed therethrough, each section of said tapered flange being located along the circumference of its associated tube section intermediate the split-surface ends.

References Cited by the Examiner

UNITED STATES PATENTS

| | | | |
|---|---|---|---|
| 2,115,495 | 4/38 | Mapelsden. | |
| 2,225,472 | 12/40 | Franklin | 16—2 |
| 2,277,637 | 3/42 | Eby | 339—103 X |
| 2,329,529 | 9/43 | Gwinn et al. | 16—2 |
| 2,912,712 | 11/59 | Shamban et al. | 16—2 |
| 2,948,773 | 8/60 | Hawes. | |

DONLEY J. STOCKING, *Primary Examiner.*